United States Patent
Bradburn et al.

(10) Patent No.: US 8,392,112 B2
(45) Date of Patent: Mar. 5, 2013

(54) DYNAMIC DETERMINATION OF OPTIMAL ROUTE DELIVERY METHOD

(75) Inventors: Travis L. Bradburn, Ortonville, MI (US); Jason J. Parks, White Lake, MI (US)

(73) Assignee: General Motors LLC., Detroit, MI (US)

( * ) Notice: Subject to any disclaimer, the term of this patent is extended or adjusted under 35 U.S.C. 154(b) by 1078 days.

(21) Appl. No.: 12/201,961

(22) Filed: Aug. 29, 2008

(65) Prior Publication Data

US 2010/0057341 A1    Mar. 4, 2010

(51) Int. Cl.
*G08G 1/0968* (2006.01)
*G01C 21/34* (2006.01)
*G06F 17/00* (2006.01)

(52) U.S. Cl. ........ 701/411; 701/414; 701/420; 701/423; 340/995.12; 340/995.13

(58) Field of Classification Search ................... 701/200, 701/201, 207, 208, 209, 210, 211, 213, 400, 701/409, 410, 411, 414, 420, 423, 425, 426, 701/438, 441; 340/988, 989, 995.12, 995.13, 340/995.18, 995.19, 995.2, 995.21
See application file for complete search history.

(56) References Cited

U.S. PATENT DOCUMENTS

| | | | | |
|---|---|---|---|---|
| 5,177,685 A | * | 1/1993 | Davis et al. | 455/456.5 |
| 5,303,159 A | * | 4/1994 | Tamai et al. | 701/210 |
| 6,266,615 B1 | * | 7/2001 | Jin | 701/213 |
| 2006/0100779 A1 | * | 5/2006 | Vergin | 701/211 |

* cited by examiner

*Primary Examiner* — Thomas Tarcza
*Assistant Examiner* — Edward Pipala

(57) ABSTRACT

A method and system for dynamic determination of optimal route delivery receives a point of interest location, a current vehicle location, and a date of first set of route directions from a telematics unit over a wireless network by a software application running on a navigation server. The application accesses the first set of route directions and a second set of route directions from a database located on a telematics service provider premises. Both the first and second set of route directions are between the current vehicle location and the point of interest. If there is a traffic obstacle along a route between the current vehicle location and the point of interest location and the traffic obstacle was implemented after the first set of directions, a live advisor sends a notification to a user and provides the user with an alternate method of delivering route directions over the wireless network.

14 Claims, 6 Drawing Sheets

DYNAMIC DETERMINATION OF OPTIMAL ROUTE DELIVERY METHOD

FIELD OF THE INVENTION

The present invention relates generally to delivering route directions, and in particular to a method and system for dynamic determination of optimal route delivery.

BACKGROUND OF THE INVENTION

Telematics services include, but are not limited to turn-by-turn directions and other navigation-related services provided in conjunction with the GPS based chipsets and components, airbag deployment notification and other emergency or roadside assistance-related services provided in connection with various crash and or collision sensor interface modules and sensors located throughout the vehicle. Telematics services also include "infotainment-related" services where music. radio content, Web pages, movies, television programs, videogames and/or other content is downloaded by an "infotainment center" operatively connected to the telematics unit.

Telematics services deliver route directions to a telematics user in many different ways. This includes verbal directions, turn-by-turn direction, and autonomous navigation unit directions. Verbal directions are provided by a telematics services live advisor and may be recorded for later playback by the user. Turn-by-turn directions are downloaded to a user's telematics unit from a navigation server located on a service provider's premises. Autonomous Navigation Unit (ANU) directions are provided by an ANU that is installed in the vehicle as part of the telematics unit. The ANU has a database from which it accesses the directions that it provides to the user.

BRIEF SUMMARY OF THE INVENTION

Aspects of the disclosure provide a method and system for dynamic determination of optimal route delivery. The method and system comprising receiving a point of interest location, a current vehicle location, and a date of first set of route directions from a telematics unit over a wireless network by a software application running on a navigation server. The software application further accesses the first set of route directions and a second set of route directions from a database located on a telematics service provider premises. Both the first set and second set of route directions relate to an area between the current vehicle location and the point of interest location. In addition, the method and system determine whether there is a traffic obstacle along a route between the current vehicle location and the point of interest location and whether the traffic obstacle was implemented after the date of the first set of directions. As result, a live advisor sends a notification to a user of the traffic obstacle and provides the user with an alternate method of delivering route directions over the wireless network.

DETAILED DESCRIPTION OF THE INVENTION

Before describing the invention in detail, an exemplary environment in which the invention may operate will be described. It will be appreciated that the described environment is for purposes of illustration only, and does not imply any limitation regarding the use of other environments to practice the invention.

Figure 1:
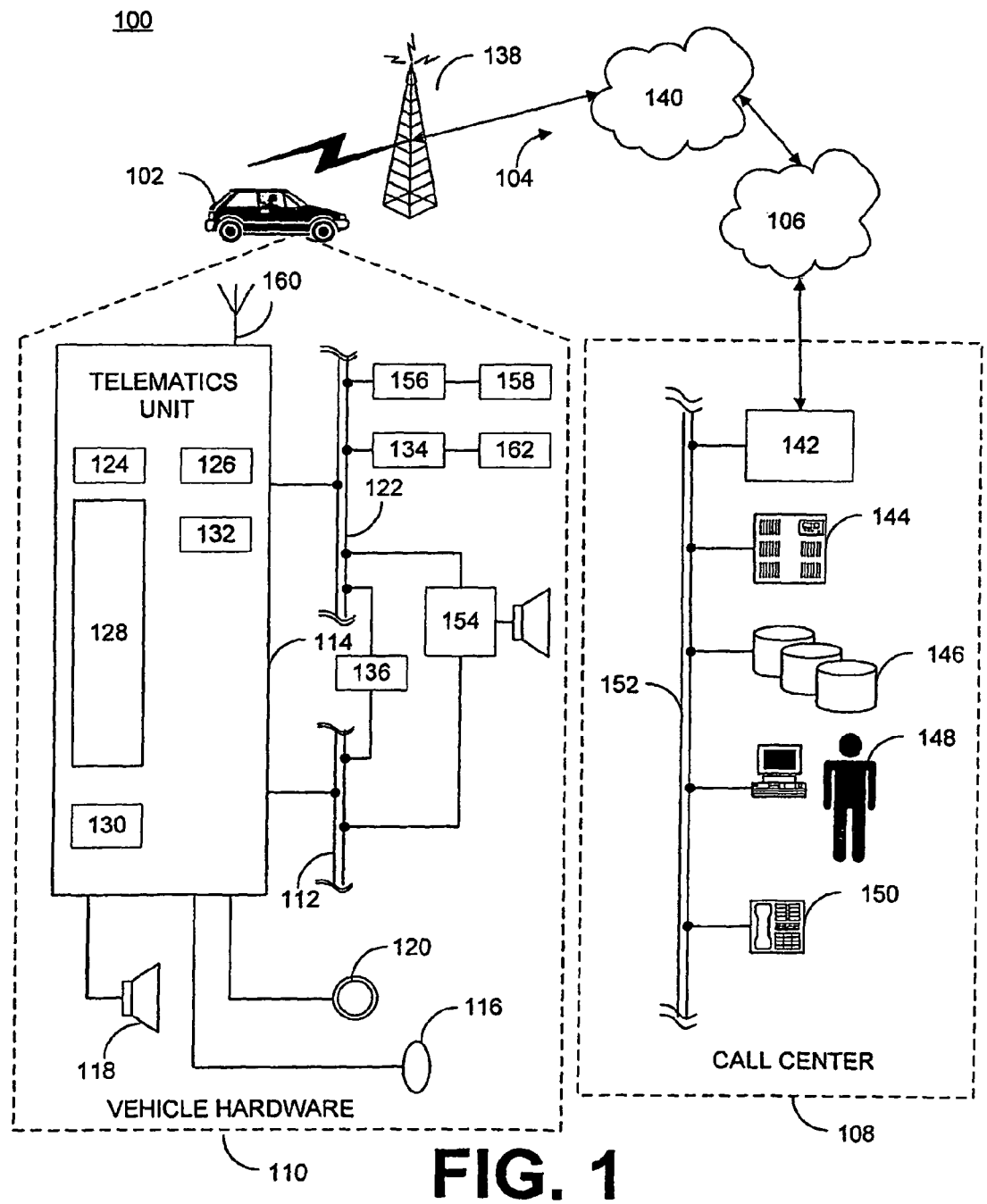
FIG. 1 is a schematic view of an example communication system within which examples of the disclosed system may be implemented.

With reference to FIG. 1 there is shown an example of a communication system 100 that may be used with the present method and generally includes a vehicle 102, a wireless carrier system 104, a land network 106 and a call center 108. It should be appreciated that the overall architecture, setup and operation, as well as the individual components of a system such as that shown here are generally known in the art. Thus, the following paragraphs simply provide a brief overview of one such exemplary information system 100; however, other systems not shown here could employ the present method as well.

Vehicle 102 is preferably a mobile vehicle such as a motorcycle, car, truck, recreational vehicle (RV), boat, plane, etc., and is equipped with suitable hardware and software that enables it to communicate over system 100. Some of the vehicle hardware 110 is shown generally in FIG. 1 including a telematics unit 114, a microphone 116, a speaker 118 and buttons and/or controls 120 connected to the telematics unit 114. Operatively coupled to the telematics unit 114 is a network connection or vehicle bus 122. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few.

The telematics unit 114 is an onboard device that provides a variety of services through its communication with the call center 108, and generally includes an electronic processing device 128 one or more types of electronic memory 130, a cellular chipset/component 124, a wireless modem 126, a dual antenna 160 and a navigation unit containing a GPS chipset/component 132. In one example, the wireless modem 126 is comprised of a computer program and/or set of software routines executing within processing device 128.

The telematics unit 114 provides too many services to list them all, but several examples include: turn-by-turn directions and other navigation-related services provided in conjunction with the GPS based chipset/component 132; airbag deployment notification and other emergency or roadside assistance-related services provided in connection with various accident and or collision sensor interface modules 156 and sensors 158 located throughout the vehicle. Infotainment-related services where music, Web pages, movies, television programs, video games and/or other content is downloaded by an infotainment center 136 operatively connected to the telematics unit 114 via vehicle bus 122 and audio bus 112. In one example, downloaded content is stored for current or later playback.

Again, the above-listed services are by no means an exhaustive list of all the capabilities of telematics unit 114, as should be appreciated by those skilled in the art, but are simply an illustration of some of the services that the telematics unit is capable of offering. It is anticipated that telematics unit 114 include a number of known components in addition to those listed above.

Vehicle communications preferably use radio transmissions to establish a voice channel with wireless carrier system 104 so that both voice and data transmissions can be sent and received over the voice channel. Vehicle communications are enabled via the cellular chipset/component 124 for voice communications and a wireless modem 126 for data transmission. In order to enable successful data transmission over the voice channel, wireless modem 126 applies some type of encoding or modulation to convert the digital data so that it can communicate through a vocoder or speech codec incorporated in the cellular chipset/component 124. Any suitable encoding or modulation technique that provides an acceptable data rate and bit error can be used with the present method. Dual mode antenna 160 services the GPS chipset/component and the cellular chipset/component.

Microphone 116 provides the driver or other vehicle occupant with a means for inputting verbal or other auditory commands, and can be equipped with an embedded voice processing unit utilizing a human/machine interface (HMI) technology known in the art. Conversely, speaker 118 provides verbal output to the vehicle occupants and can be either a stand-alone speaker specifically dedicated for use with the telematics unit 114 or can be part of a vehicle audio component 154. In either event, microphone 116 and speaker 118 enable vehicle hardware 110 and call center 108 to communicate with the occupants through audible speech. The vehicle hardware also includes one or more buttons or controls 120 for enabling a vehicle occupant to activate or engage one or more of the vehicle hardware components 110. For example, one of the buttons 120 can be an electronic push button used to initiate voice communication with call center 108 (whether it be a live advisor 148 or an automated call response system). In another example, one of the buttons 120 can be used to initiate emergency services.

The audio component 154 is operatively connected to the vehicle bus 122 and the audio bus 112. The audio component 154 receives analog information, rendering it as sound, via the audio bus 112. Digital information is received via the vehicle bus 122. The audio component 154 provides AM and FM radio, CD, DVD, and multimedia functionality independent of the infotainment center 136. Audio component 154 may contain a speaker system, or may utilize speaker 118 via arbitration on vehicle bus 122 and/or audio bus 112.

The vehicle accident and/or collision detection sensor interface 156 are operatively connected to the vehicle bus 122. The accident sensors 158 provide information to the telematics unit via the accident and/or collision detection sensor interface 156 regarding the severity of a vehicle collision, such as the angle of impact and the amount of force sustained.

Vehicle sensors 162, connected to various sensor interface modules 134 are operatively connected to the vehicle bus 122. Example vehicle sensors include but are not limited to gyroscopes, accelerometers, magnetometers, emission detection and/or control sensors, and the like. Example sensor interface modules 134 include powertrain control, climate control, and body control, to name but a few.

Wireless carrier system 104 is preferably a cellular telephone system or any other suitable wireless system that transmits signals between the vehicle hardware 110 and land network 106. According to an example, wireless carrier system 104 includes one or more cell towers 138, base stations and/or mobile switching centers (MSCs) 140, as well as any other networking components required to connect the wireless system 104 with land network 106. A component in the mobile switching center may include a remote data server 180. As appreciated by those skilled in the art, various cell tower/base station/MSC arrangements are possible and could be used with wireless system 104. For example, a base station and a cell tower could be co-located at the same site or they could be remotely located, and a single base station could be coupled to various cell towers or various base stations could be coupled with a single MSC, to but a few of the possible arrangements. Preferably, a speech codec or vocoder is incorporated in one or more of the base stations, but depending on the particular architecture of the wireless network, it could be incorporated within a Mobile Switching Center or some other network components as well.

Land network 106 can be a conventional land-based telecommunications network that is connected to one or more landline telephones and connects wireless carrier network 104 to call center 108. For example, land network 106 can include a public switched telephone network (PSTN) and/or an Internet protocol (IP) network, as is appreciated by those skilled in the art. Of course, one or more segments of the land network 106 can be implemented in the form of a standard wired network, a fiber or other optical network, a cable network, other wireless networks such as wireless local networks (WLANs) or networks providing broadband wireless access (BWA), or any combination thereof.

Call Center (OCC) 108 is designed to provide the vehicle hardware 110 with a number of different system back-end functions and, according to the example shown here, generally includes one or more switches 142, servers 144, databases 146, live advisors 148, as well as a variety of other telecommunication and computer equipment 150 that is known to those skilled in the art. These various call center components are preferably coupled to one another via a network connection or bus 152, such as the one previously described in connection with the vehicle hardware 110. Switch 142, which can be a private branch exchange (PBX) switch, routes incoming signals so that voice transmissions are usually sent to either the live advisor 148 or an automated response system, and data transmissions are passed on to a modem or other piece of equipment 150 for demodulation and further signal processing. The modem 150 preferably includes an encoder, as previously explained, and can be connected to various devices such as a server 144 and database 146. For example, database 146 could be designed to store subscriber profile records, subscriber behavioral patterns, or any other pertinent subscriber information. Although the illustrated example has been described as it would be used in conjunction with a manned call center 108, it will be appreciated that the call center 108 can be any central or remote facility, manned or unmanned, mobile or fixed, to or from which it is desirable to exchange voice and data.

Figure 2:
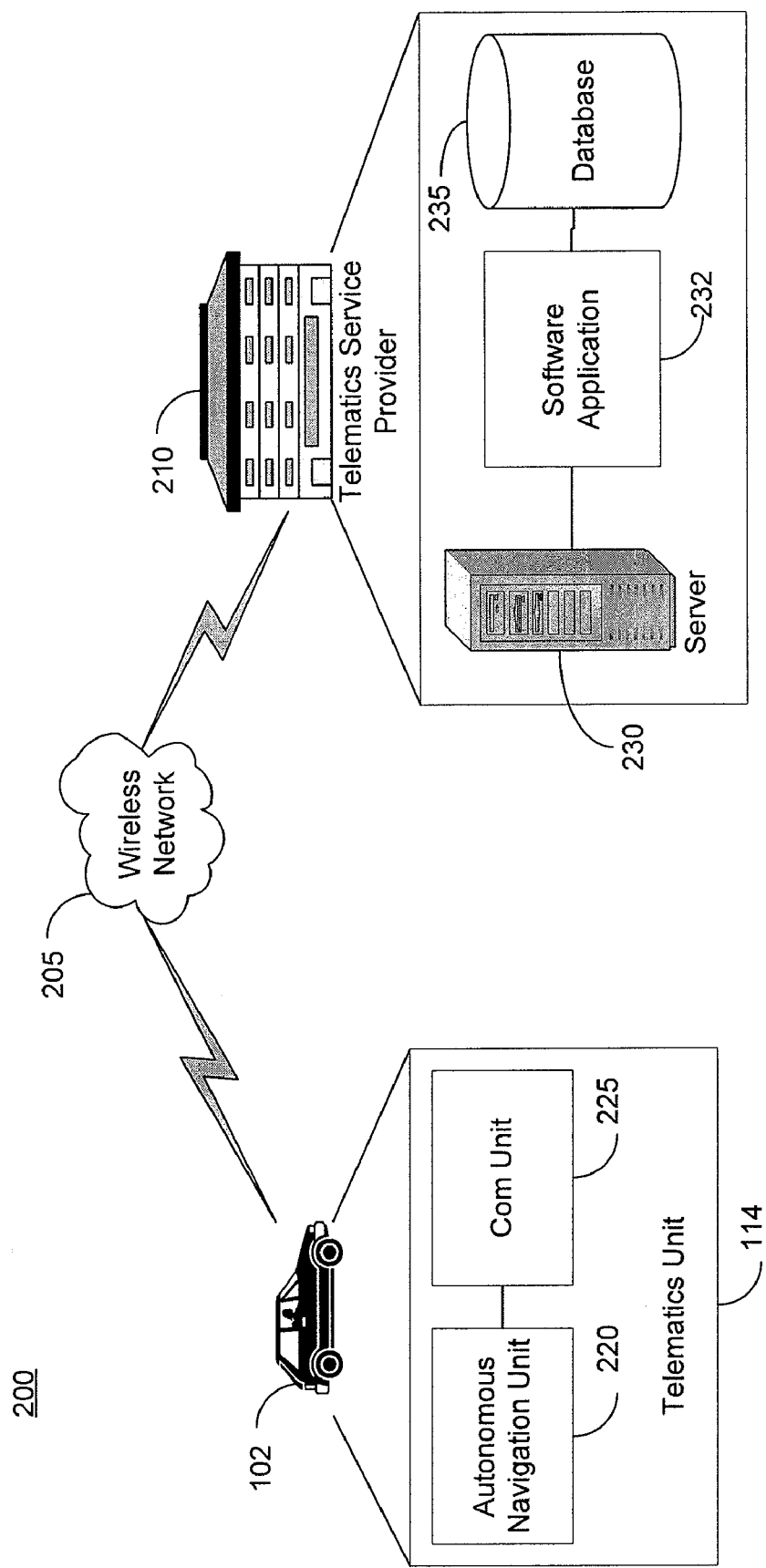
FIG. 2 is a schematic view of an exemplary system architecture in keeping with the disclosed principles.

FIG. 2 is a schematic view of an exemplary system architecture in keeping with the disclosed principles. A telematics unit 114 installed in a vehicle 102 comprises of an autonomous navigation unit (ANU) 220 and a communication unit 225. The ANU 220 contains a database of maps, directions, points of interest, and other geographical data that can be requested by the user (e.g., vehicle driver). A user may request from the ANU 220 a point of interest (POI) and then request directions to the POI from the vehicle's current location. However, the directions contained in the ANU 220 to the POI may be inaccurate because they are outdated. For example, the directions may not incorporate recent road closures or other traffic obstacles such as traffic congestion, parade routes, detours, road construction, etc. Thus, a vehicle driver or user may find himself provided with outdated directions. Therefore, the communication unit 225 sends the telematics service provider 210 the POI and other relevant data across a wireless network 205. A software application 232 running on a server 230 receives the POI and other data. The software application 232 retrieves the directions to the POI from a database 235 and determines whether there are any recent road closures or other traffic obstacles between the user's current location and the POI. If so, the software application notifies an advisor to call the user to make him aware of the road closure, and if requested, and updated set of directions to the POI.

Figure 3:
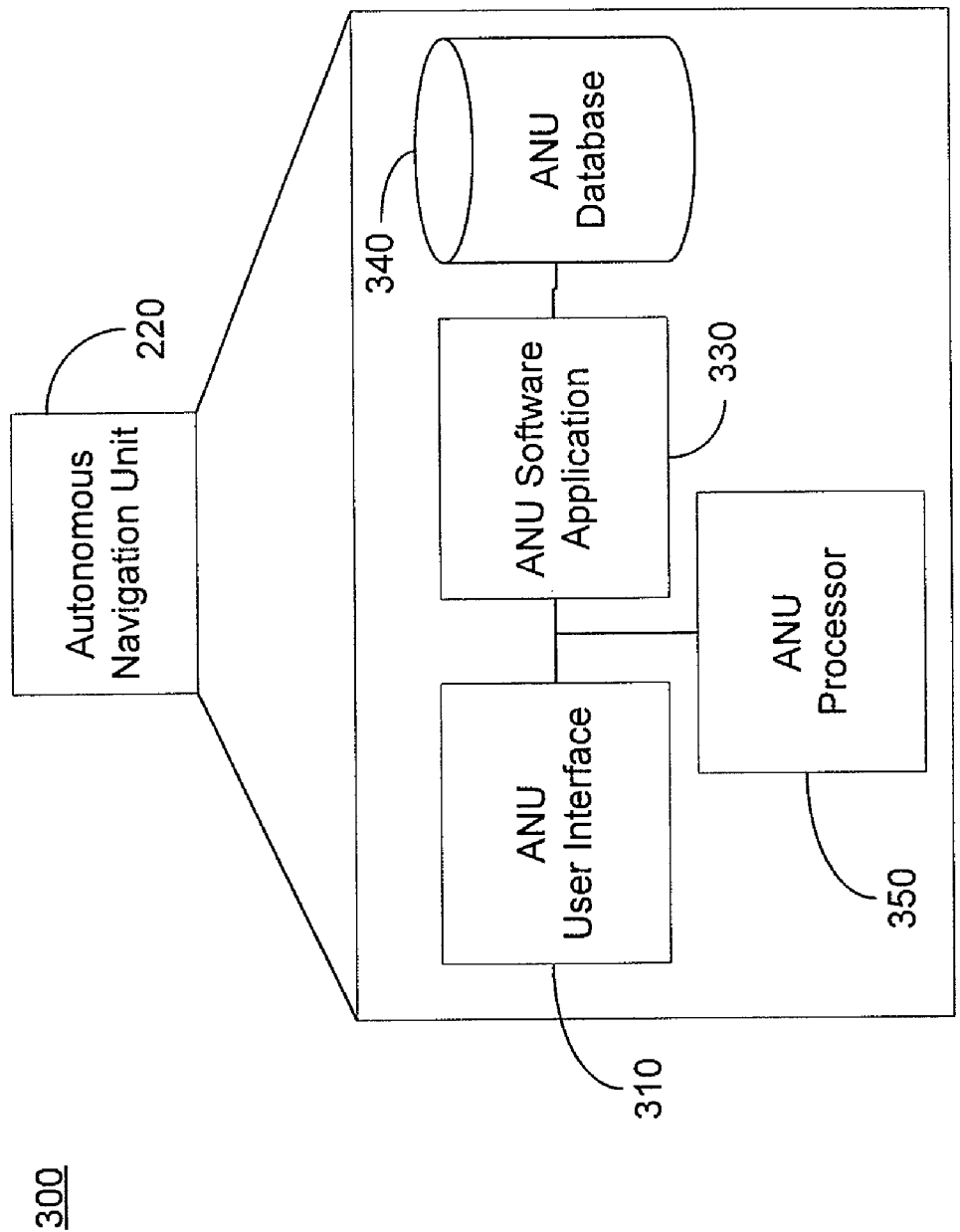
FIG. 3 is illustrates an autonomous navigation unit 220 that is part of an exemplary system and method for dynamically determining optimal route delivery.

FIG. 3 is illustrates an autonomous navigation unit 220 that is part of an exemplary system and method for dynamically determining optimal route delivery. The ANU 220 comprises of an ANU user interface 310, an ANU software application 330, an ANU database 340, and an ANU processor 350. A vehicle driver may enter a POI into the ANU using the ANU user interface 310. The ANU processor 350 runs the ANU software application 330 such that the ANU software application collects the POI data from the ANU user interface 310. Further, the ANU software application may find the location (e.g., address) of the POI from the ANU database 340. In addition, the software application records the vehicle's current location. Subsequently, the ANU software application 330 may access the route directions from the vehicle's current location to the POI from the ANU database 340. The ANU software application 330 may further display the route directions on the ANU user interface 310.

Figure 4:
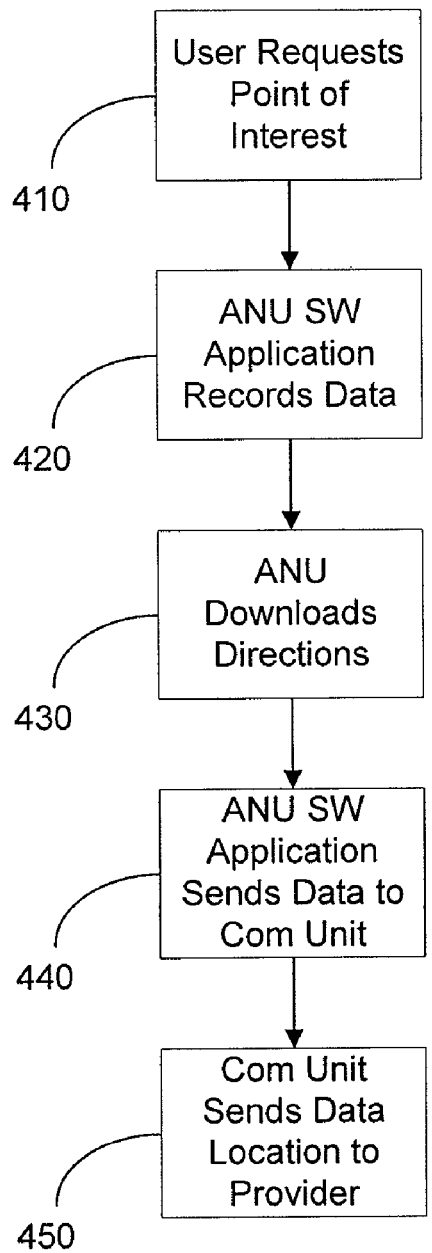
FIG. 4 is a flow diagram that illustrates an exemplary method for dynamically determining the optimal route delivery.

FIG. 4 is a flow diagram that illustrates an exemplary method for dynamically determining the optimal route delivery. At step 410, a user requests a POI from the ANU. At step 420, the ANU software application records the POI data and finds the location of the POI from the ANU database. Further, the software application may record the vehicle's current location. At step 430, the ANU software application downloads the route directions to the POI from the ANU database and provides them to the user through an ANU user interface. Further, the ANU software application may record the date of the directions in the ANU database (i.e. ANU route directions). At step 440, the ANU software application sends the POI location, the vehicle's current location, and the date of the directions contained in the ANU database to the communication unit of the telematics unit. At step 450, the communication unit sends the POI location and the user's current location to the telematics provider as well as the date of the ANU directions.

Figure 5:
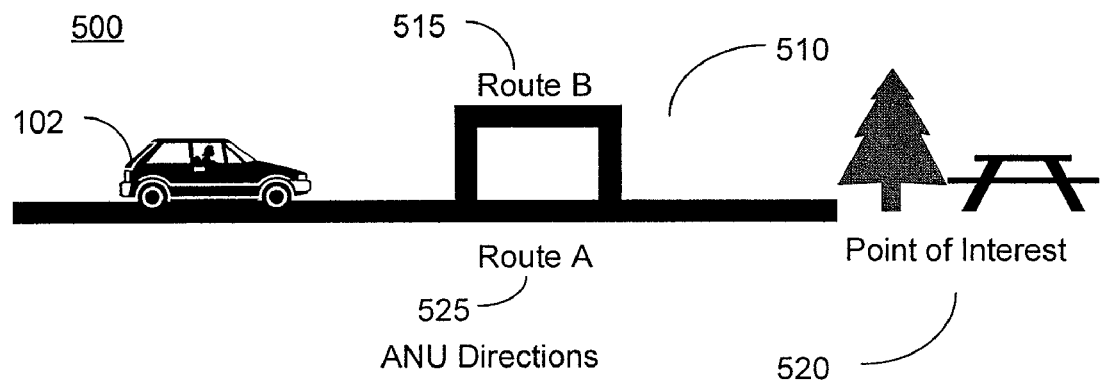
FIG. 5 illustrates a exemplary step comparing Autonomous Navigation Unit directions with a Navigation Server's directions to a POI as part of an exemplary method and system for dynamically determining the optimal route delivery.
Figure 5:
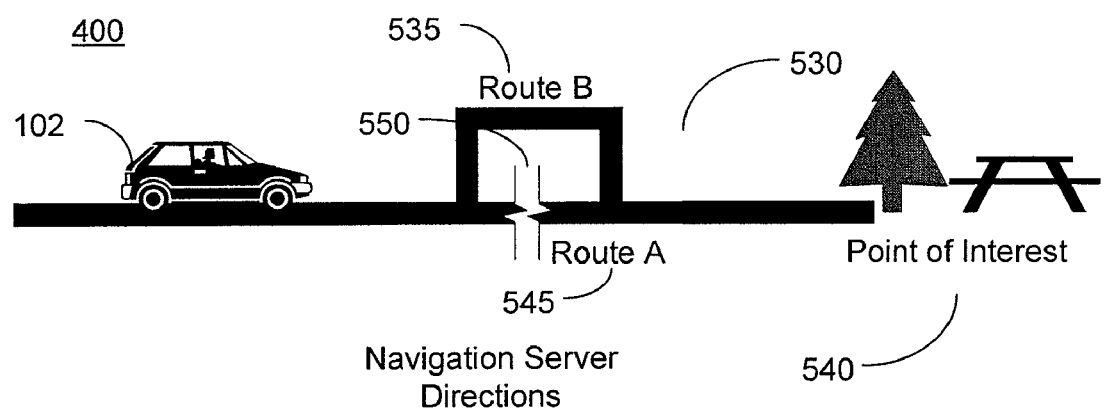

FIG. 5 illustrates an exemplary step comparing Autonomous Navigation Unit directions with a Navigation Server's directions to a POI as part of an exemplary method and system for dynamically determining the optimal route delivery. A navigation server located on a telematics service provider's premises may receive a POI location, a user's current location, and the date of ANU directions between the user's current location and the POI location. A software application running on a navigation server may analyze this data and download ANU route directions and the most current route directions between the POI location and the user's current location from a database. The ANU route directions 510 may be as shown as in FIG. 5. It shows a vehicle 102 driving on a road to the POI 520. The most direct route to the POI 520 is along Route A 525. However, in the most current directions found by the Navigation Server (i.e., Navigation Server Directions), a recent road closure 550 has been discovered along Route A 545. Thus, a telematics service provider may notify a user of the recent road closure 550 and provide the user with route directions along Route B 535 to the POI.

Figure 6:
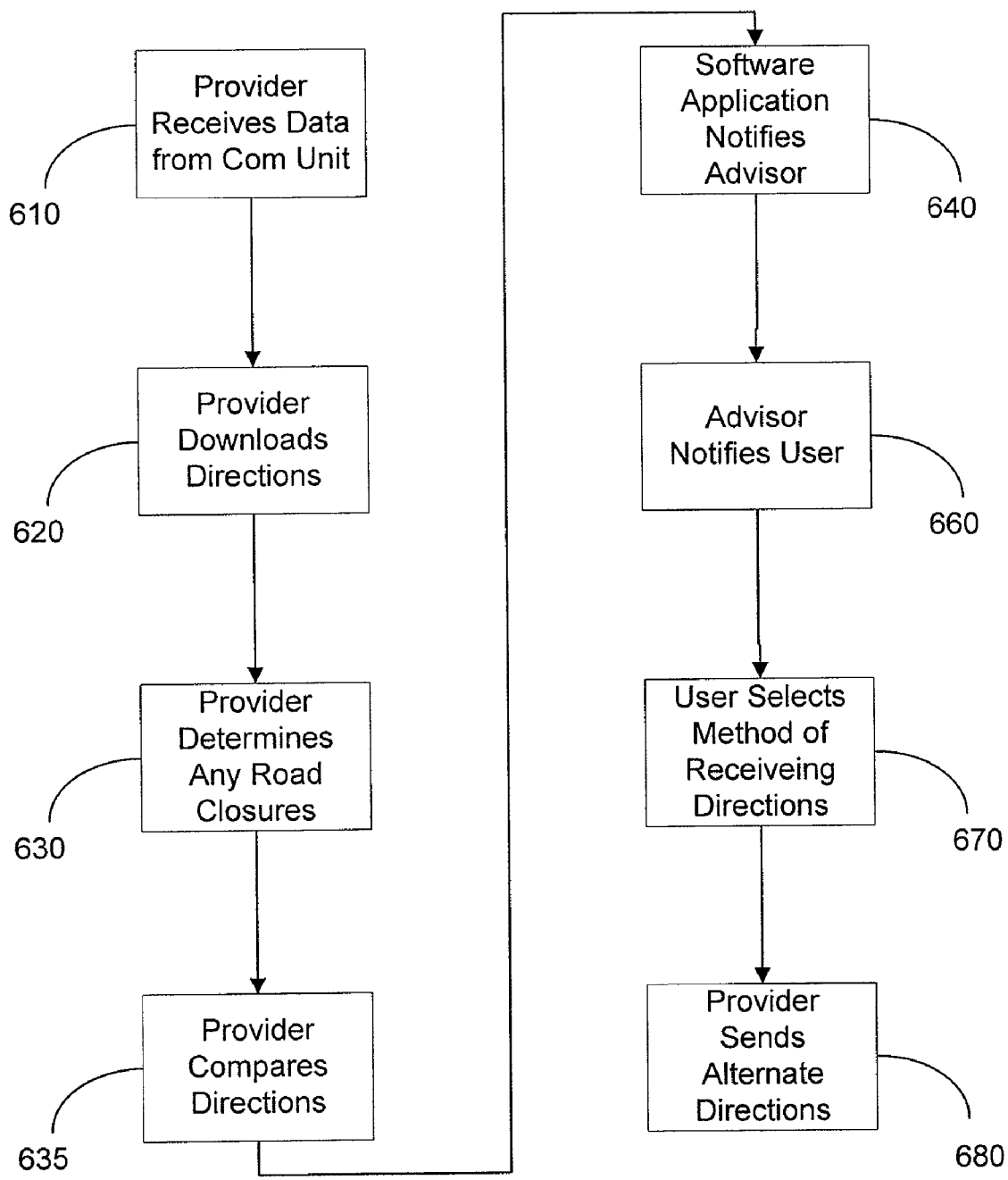
FIG. 6 is a flow diagram that illustrates an exemplary method for dynamically determining the optimal route delivery.

FIG. 6 is a flow diagram that illustrates an exemplary method for dynamically determining the optimal route delivery. At step 610, a software application running on a server located on the telematics service provider premises receives the POI location, user's location, and the date of the ANU directions. At step 620, the software application accesses the most current route directions and the ANU route direction to the POI from the user's current location from a database. At step 630, the software application determines if there are any road closures or any other traffic obstacles (traffic congestion, parade routes, detours, road construction, etc.) along the route. At step 635, the software application compares the date of the traffic obstacle with the date of ANU directions to determine whether the ANU directions incorporate the traffic obstacle. If not, at step 640, the software application notifies an advisor of the outdated ANU route directions requested by the user and the particular traffic obstacle along the route. At step 650, the advisor notifies the user across a wireless network that the ANU directions are out of date and that there is a traffic obstacle along the route. It then offers the user different alternatives to receive the updated route directions. This includes verbal directions from the advisor such that the user can record for later playback. Alternatively, the telematics service provide can send the user turn-by-turn directions through its telematics unit. However, if the user is in an area where there is no wireless packet data service, then the telematics service provider cannot send turn-by-turn directions to the user's telematics unit. Instead, the user's only choice is to receive updated route directions verbally from the advisor. At step 670, the user selects an alternative method for receiving the updated route directions. At step 680, the provider sends the updated route directions to the user through the alternate method.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Certain implementations of this invention are described herein, including the best mode known to the inventors for carrying out the invention. Variations of those implementations may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. A method for dynamic determination of optimal route delivery, the method comprising:
   receiving a point of interest location, a current vehicle location, and a date of first set of route directions from a telematics unit over a wireless network;
   accessing the first set of route directions and a second set of route directions by a software application running on a navigation server from a database, wherein both the first set and second set of route directions are between the current vehicle location and the point of interest location;
   determining whether there is a traffic obstacle along a route between the current vehicle location and the point of interest location;
   determining whether the traffic obstacle was implemented after the date of the first set of directions;
   sending a notification to a telematics service user of the traffic obstacle; and
   providing the telematics service user with an alternate method of delivering route directions over the wireless network.

2. The method according to claim 1, the method further comprising notifying a live advisor of the traffic obstacle along the route between the current vehicle location and the point of interest location.

3. The method according to claim 1, wherein the first set of directions is downloaded from a database within an autonomous navigation unit that is part of the telematics unit.

4. The method according to claim 1, wherein the traffic obstacle is selected from the group consisting of traffic congestion, parade routes, detours, road construction, and road closure.

5. The method according to claim 1, wherein the alternative method of delivering route directions is selected from the group consisting of verbal route directions and turn-by-turn directions.

6. The method according to claim 5, the method further comprising determining whether the wireless network supports packet data service.

7. A method for dynamic determination of optimal route delivery, the method comprising:
   downloading a first set of route directions from a database within an autonomous navigation unit that is between a current vehicle location and a point of interest location;
   determining a date of the first set of route directions;
   sending the point of interest location, the current vehicle location, and the date of the first set of route directions to a telematics service provider over a wireless network; and
   receiving a second set of route directions between the current vehicle location and the point of interest location, from the telematics service provider, through an alternate method of delivering route directions, wherein the second set of route directions includes a traffic obstacle not in the first set of route directions.

8. A system for dynamic determination of optimal route delivery, the system comprising:
   a software application running on a navigation server that accesses route directions and geographical data from a database containing selected route directions and geographical data;
   a telematics unit installed in a vehicle that provides telematics services to a user;
   a wireless network that provides communication between the telematics unit and the navigation server;
   an autonomous navigation unit installed within the telematics unit
   a user interface through which the user can request a point of interest;
   an autonomous navigation unit database containing route directions and geographical data; and
   an application for accessing the point of interest location from the autonomous navigation unit database, determining a current vehicle location, downloading a first set of route directions between the current vehicle location and the point of interest location, and determining the date of the first set of route directions.

9. The system according to claim 8, wherein the application provides the user the first set of route directions through the user interface.

10. The system according to claim 8, wherein the application sends the telematics service provider the point of interest location, the current vehicle location, and the date of the first set of route directions over the wireless network.

11. The system according to claim 8, wherein the application is running on a navigation server and receives the point of interest location, the current vehicle location, and the date of first set of route directions from a telematics unit over a wireless network; accesses the first set of route directions and a second set of route directions the database located on the telematics service provider's premises, wherein both the first set and second set of route directions are between the current vehicle location and the point of interest location; determines whether there is a traffic obstacle along route between the current vehicle location and the point of interest location; determines whether the traffic obstacle was implemented after the date of the first set of directions; sends a notification to a telematics service user of the traffic obstacle by a live advisor; and provides the user with an alternate method of delivering route directions over the wireless network.

12. The system according to claim 11, wherein the alternative method of delivering route directions is selected from the group consisting of verbal route directions and turn-by-turn directions.

13. The system according to claim 11, wherein the software application further determines whether the wireless network supports packet data service.

14. The system according to claim 11, wherein the traffic obstacle is selected from the group consisting of traffic congestion, parade routes, detours, road construction, and road closures.

* * * * *